Patented Apr. 24, 1928.

1,667,490

UNITED STATES PATENT OFFICE.

WILLIAM C. PIVER, OF HILLSIDE, NEW JERSEY.

PROCESS FOR MAKING CALCIUM ARSENATE.

No Drawing.   Application filed January 18, 1924.  Serial No. 687,134.

This invention relates to a process for the manufacture of calcium arsenate with which it is possible to produce the product directly from the chemical reactions in a dry powdered form, free from soluble arsenic salts, and suitable for use as an insecticide without further treatment.

The distinguishing feature of my process is its simplicity and practical features, which provide a commercial process for the manufacture of a calcium arsenate having various amounts of arsenic content, as desired, and, also, avoiding the necessity of any further or final treatment of the arsenate so produced to render it suitable for use as an insecticide, the product produced by my process being in the dry, finely powdered form desired for the uses to which such a product is adapted.

It is known that when dry, calcium hydroxide, or hydrated lime and arsenic acid, in suitable form, are brought together, considerable heat is generated. Dry hydrated lime requires between 500 and 600 deg. C. to be applied by the ordinary methods before it releases its water of hydration, but such does not seem to be the case when it is brought into contact with arsenic acid. In the latter case, not only is the water released from the dry calcium hydroxide, but the heat generated also evaporates or throws off the excess water of hydration of the acid, at least, so far as is necessary to obtain the results desired in the present process.

Utilizing these facts, I provide a dry hydrated lime by hydrating the ordinary lump lime with water, but only to a sufficient degree to disintegrate the same and to produce a dry, powdered product. The amount of water required to accomplish this is approximately one-third, by weight, of the amount of lime used. This dry, hydrated lime is then placed in a container of the type found in the usual mixing and milling devices, which rotate and agitate the same. While this is being done, arsenic acid of a predetermined specific gravity is applied to the dry hydrated lime, which may be done by spraying or otherwise. The specific gravity of the arsenic acid used is determined by the arsenic content desired in the final product. For instance, if a small arsenic content is desired the acid used will be of less specific gravity than would be the case if a large arsenic content was required. The specific gravity of the arsenic acid is also always kept at a point where there will be only a small excess of water present in the reaction of such an amount that it is all evaporated or driven off by the heat of the reaction, thus producing the final product in the dry, powdered form.

It will be seen that the process is a dry method from start to finish, maintaining the intermediate and final products of the reactions in a dry form during the entire treatment, and that the same avoids the use of any complicated chemical or mechanical steps, producing the final product, calcium arsenate, in the desired form necessary to adapt it for use as an insecticide by a method which is extremely simple and comparatively inexpensive to carry out commercially.

What I claim is:—

1. A process for making calcium arsenate, which consists in first hydrating calcium oxide only to a sufficient degree to hydrate the same and to produce a dry product, agitating the hydrated calcium oxide and applying arsenic acid of a predetermined specific gravity thereto while being agitated, the acid being applied only in sufficient quantity and at a rate to cause the heat of the resultant reaction to drive off any excess water present, including the water of hydration, to produce the calcium arsenate in a dry powder form.

2. A process for making calcium arsenate, which comprises first the formation of calcium hydroxide by adding to calcium oxide only sufficient water to hydrate the same into a dry powdered form, and then treating this product with arsenic acid sufficient only to produce the calcium arsenate in dry powdered form.

3. A process for making calcium arsenate, which comprises first the formation of calcium hydroxide by adding to calcium oxide only sufficient water to hydrate the same into a dry powdered form, and then treating this product with arsenic acid of a predetermined specific gravity dependent upon the arsenic content desired in the final product and sufficient only to produce the calcium arsenate in a dry powdered form.

4. A process for making calcium arsenate, which consists in first forming calcium hydroxide by adding to calcium oxide only sufficient water to hydrate the same into a dry powdered form, and then treating this product with arsenic acid, maintaining the intermediate and final products of the reactions in a dry form during the entire treatment and producing the calcium arsenate in a dry powdered form directly from the reactions.

5. A process for making calcium arsenate, comprising first treating a given amount of calcium oxide with only a sufficient amount of water required for its complete hydration, and then the addition of arsenic acid of a predetermined specific gravity thereto to produce the calcium arsenate in a dry powdered form.

6. A process for making calcium arsenate, comprising first treating a given amount of calcium oxide with only a sufficient amount of water required for its complete hydration, and then while agitating adding arsenic acid of a predetermined specific gravity thereto to produce the calcium arsenate in a dry powdered form directly from the reaction.

Signed at New York, in the county of New York, and State of New York, this 9th day of January, A. D. 1924.

WILLIAM C. PIVER.